United States Patent [19]

Kalivretenos et al.

[11] 4,389,028
[45] Jun. 21, 1983

[54] FLAT TRAJECTORY PROJECTILE

[75] Inventors: Chris A. Kalivretenos, Hyattsville; Michael A. Brown, Columbia, both of Md.

[73] Assignee: The United States of America as represented by the Secretary of the Navy, Washington, D.C.

[21] Appl. No.: 649,614

[22] Filed: Jan. 14, 1976

[51] Int. Cl.³ ............................................. F42B 15/02
[52] U.S. Cl. .................................. 244/3.21; 244/3.1; 244/3.23; 244/3.27
[58] Field of Search ................ 244/3.1, 3.16, 320, 244/3.21, 3.22, 3.23, 3.24, 3.25, 3.26, 3.27, 3.28, 3.29; 89/1.8; 74/5.12, 5.41, 5.44; 46/50

[56] References Cited

U.S. PATENT DOCUMENTS

| | | | |
|---|---|---|---|
| 3,067,682 | 12/1962 | Feldmann et al. | 244/3.23 |
| 3,135,484 | 6/1964 | Herrman | 244/3.21 X |
| 3,195,462 | 7/1965 | Petre | 244/3.1 X |
| 3,869,101 | 3/1975 | Schnabele et al. | 244/3.1 |
| 3,920,200 | 11/1975 | Evans | 244/3.16 |
| 3,946,967 | 3/1976 | Rodgers | 244/3.2 |

Primary Examiner—Harold J. Tudor
Attorney, Agent, or Firm—R. S. Sciascia; A. L. Branning

[57] ABSTRACT

An unguided projectile achieves a flat trajectory by generating gravity-countering aerodynamic lift. The lifting device is stabilized in roll by a displacement-type gyroscope which is mounted directly to the lifting section of the projectile. Both the lifting device and the gyroscope are mounted on bearings to permit free rotation of the projectile body relative to the roll-stabilized lifting section. Lift vector orientation is maintained irrespective of projectile roll.

25 Claims, 9 Drawing Figures

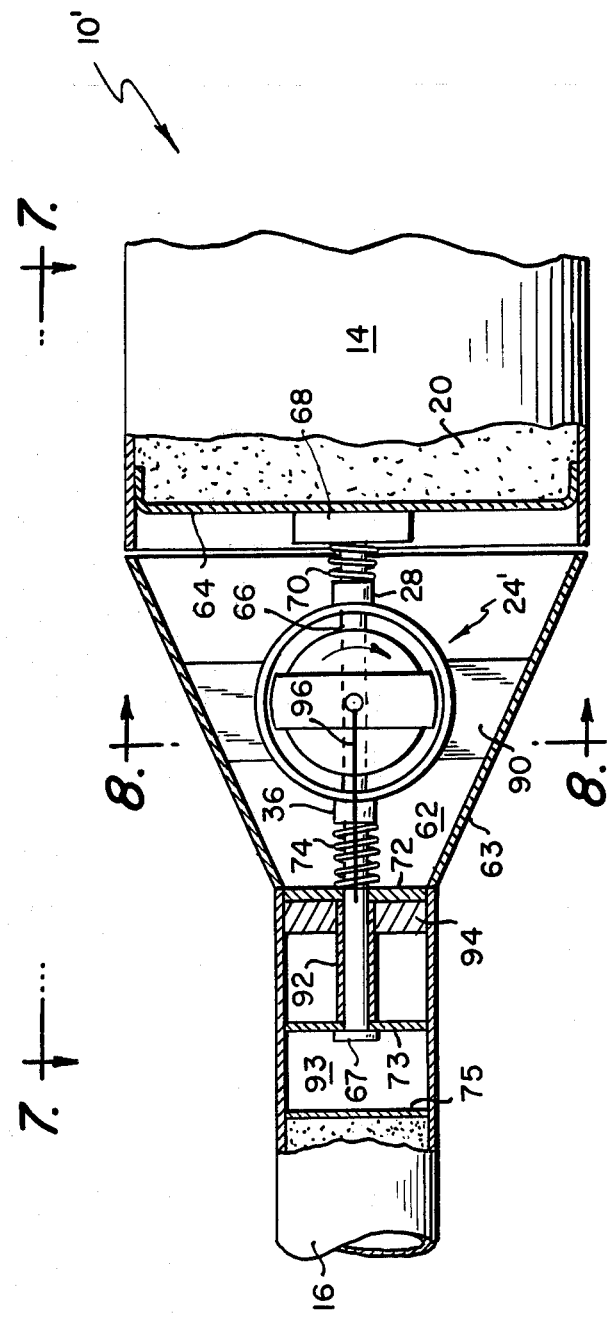
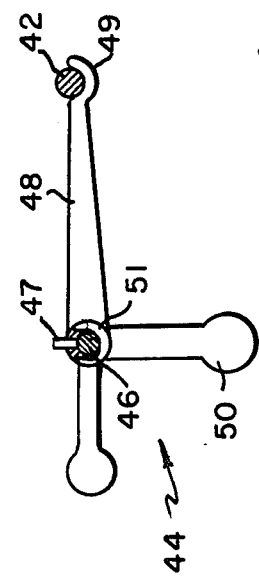

FLAT TRAJECTORY PROJECTILE

BACKGROUND OF THE INVENTION

The present invention generally relates to aerodynamic control systems. More particularly, it relates to trajectory control systems for high-speed, unguided projectiles.

Requirements exist for an unguided projectile having a flat trajectory flight capability. For example, in military applications an anti-tank weapon system is a lightweight, hand-held weapon capable of launching an explosive-laden projectile directly at a vehicle target located at a moderate distance. Preferably, the projectile should possess good armor penetration capability and fly a flat trajectory. Existing weapon systems of this type employ low projectile launch velocities which result in lofted trajectories. This in turn requires the user to make time-consuming range estimates and subsequent launcher adjustments. Unfortunately, these launcher adjustments are inaccurate since it is very difficult to estimate range to better than 30 percent. Thus, this substantially reduces the first round hit probability of the system.

Flattening of the trajectory of a projectile fired from a hand-held launcher can be accomplished by increasing the launch velocity of the projectile and/or by employing projectile lift. There is, however, a limit on the permissible velocity increase because of the recoil factor. For example, if the desired vertical drop of a five-pound projectile at a target range of 250 meters is one foot, then the launch velocity would have to be increased to approximately 3300 ft/sec. This is far in excess of the capability of any existing or planned, hand-held launching system. Thus, until a far superior recoil and blast abatement system is conceived and built, the direct means of achieving a flat trajectory, namely, greatly increased initial velocity, will have to be held in abeyance.

Alternative methods of achieving a flat trajectory include providing the projectile with lift and lift combined with increased initial launch velocity, the latter permitting design tradeoffs between launch velocity and the size of the lifting surfaces required. These alternative methods, however, present their own set of problems. In the design of a lifting projectile, the lift force should be equal to the weight of the projectile, and means must be provided for orienting and maintaining this lift force in the vertical direction.

Lift can be generated easily by using wings, fins, body asymmetries, jets, etc. Orientation of the lift vector, however, is a much more difficult problem. Because of manufacturing asymmetries of the stabilizer and of lifting surfaces, the projectile will develop significant roll displacements in flight. The resulting roll rates can be large since the axial moment of inertia of these projectiles is extremely low, varying in the range of 0.0012 to 0.0025 slug feet squared. Controlling the roll of the lift vector, then, is a major problem in the design of lifting projectiles for flat-trajectory flight. In the interest of providing a lifting projectile that is simple and inexpensive, the more costly active roll control systems are not attractive in comparison to the simple, passive and semiactive types of roll control systems. Active control systems employ sensors to produce signals to regulate the control surfaces in response to motion outside of a predetermined, acceptable range. Passive control systems employ fixed-orientation control surfaces which are not self-correcting in response to a motion deviation and semiactive systems incorporate into the control surfaces a predetermined amount of corrective control, usually via mechanical means.

Methods of controlling or minimizing the roll displacement of the projectile can be categorized as follows: (a) roll minimization, (b) roll resistance, (c) aerodynamic roll stabilization techniques, (d) attitude stabilization, (e) gravity orientation, (f) gyro-orientation, and (g) ballutes and streamers. Each of these methods possesses limitations when applied to roll control of a lifting projectile launched from a hand-held weapon system, such as inadequate or improper roll control, complexity, too expensive, or introduction of other aerodynamic control problems.

The present invention provides an unguided projectile, particularly useful with hand-held launcher weapon systems, which effectively flies a flat trajectory, is simple in design and easy to use in the field, and obviates the problems considered hereinabove which exist in current projectiles of similar application. The herein-described projectile achieves a flat trajectory by the generation of aerodynamic lift to counter the effect of gravity. The lifting device is stabilized in roll by a simple, displacement type gyroscope directly linked to the lifting section of the projectile. The lifting device and the gyroscope are both mounted on bearings to permit free rotation of the projectile body relative to the roll-stabilized lifting device for lift orientation independent of projectile attitude.

The present invention is related to copending application Ser. No. 649,615, filed Jan. 14, 1976 by Michael A. Brown et al., entitled "Adapter Assembly For Flat Trajectory Flight".

SUMMARY OF THE INVENTION

Accordingly, it is an object of the present invention to provide an unguided projectile capable of flat trajectory flight.

Another object of the invention is to provide an unguided projectile having the capability of achieving a flat trajectory in a simple and inexpensive fashion.

Another object of the invention is to provide an unguided projectile having a flat trajectory capability which can be aimed directly at its destination or target.

Another object of the invention is to provide an unguided projectile capable of flat trajectory flight which is easy to launch without requiring corrections for attitude drop at its destination or target.

Yet another object of the invention is to provide an unguided projectile which generates lift to produce a flat trajectory in flight.

Still another object of the invention is to provide an unguided, lift-producing projectile capable of flat trajectory flight and having a moderate launch velocity.

A further object of the invention is to provide an unguided lift-generating projectile that is roll stabilized to fly a flat trajectory.

Yet a further object of the invention is the provision of an unguided, lift-generating projectile that it gyroscopically stabilized in roll to fly a flat trajectory.

A still further object of the invention is the provision of a gyroscopically-stabilized, lift-generating, unguided projectile capable of flat-trajectory flight which permits projectile body rotation relative to the lift-generating device.

Briefly, these and other objects of the invention are attained in a tube-launched, unguided projectile capable of a flat-trajectory flight which is provided with an aerodynamic lift-generating device that is roll-stabilized to maintain the lift vertical to counter the effect of gravity irrespective of projectile roll. A simple, displacement type gyroscope is directly linked to the lift-generating device, both being mounted on bearings to permit free rotation of the projectile body relative to the roll-stabilized, lift-generating device. An aerodynamic nosetip orients the projectile at the proper pitch attitude to produce the lift in one embodiment, and retractable lifting surfaces are employed in an alternative embodiment to produce the required lift. In each embodiment, acceleration responsive means initiate gyroscope control to maintain roll orientation of the lift vector vertically.

BRIEF DESCRIPTION OF THE DRAWINGS

A more complete understanding of the invention and a fuller appreciation of the many attendant advantages thereof will be derived by reference to the following detailed description when considered in connection with the accompanying drawings, wherein:

FIG. 4 is an elevational view of the gyroscope caging means;

FIG. 6 is a partial, sectioned, elevation view of an alternative embodiment of the projectile of the present invention;

DESCRIPTION OF THE PREFERRED EMBODIMENTS

Figure 1:
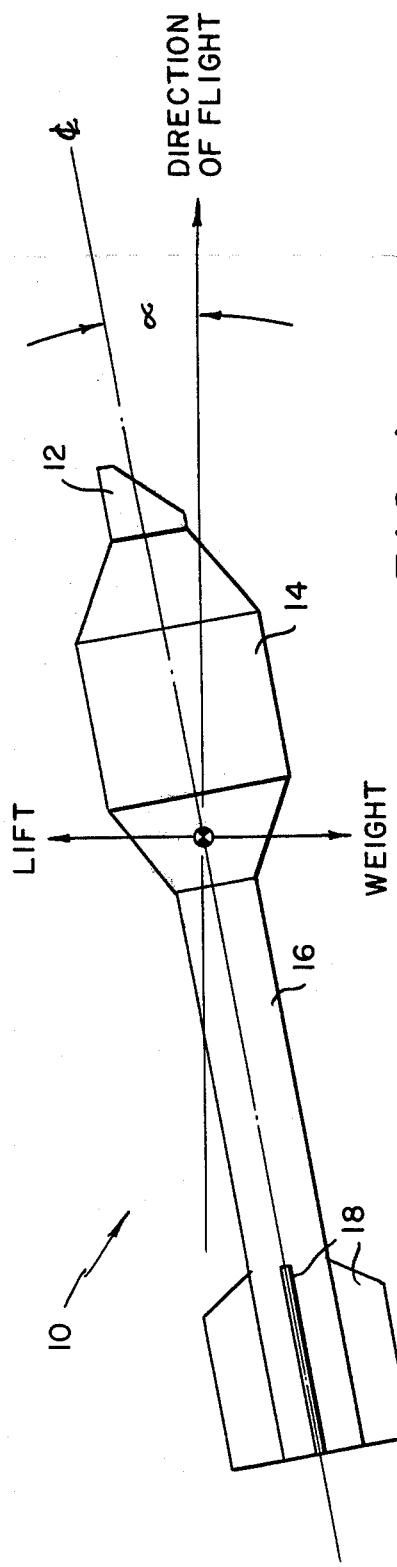
FIG. 1 is an embodiment of the projectile of the present invention in flight.
Figure 9:
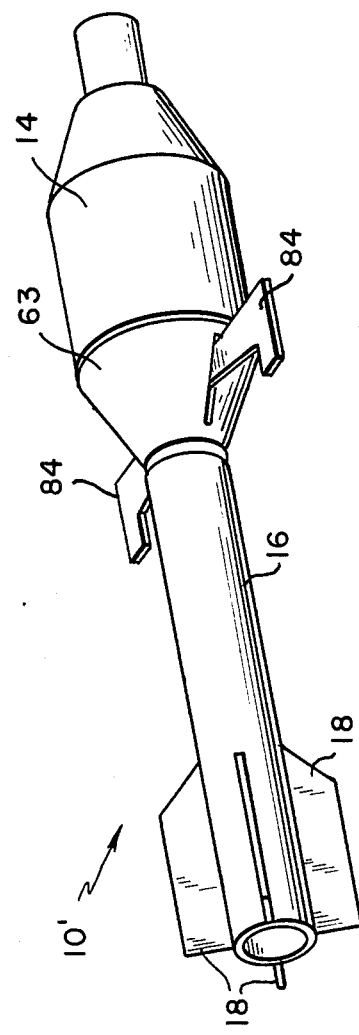
FIG. 9 shows the projectile of FIG. 6 in flight.

Referring now to the drawings, wherein like reference characters designate identical or corresponding parts throughout the several views, and more particularly to FIG. 1 thereof, an unguided projectile 10 incorporating the roll-stabilized, lifting nosetip embodiment of the present invention is shown in the flight attitude subsequent to launch. The projectile 10 has a lift-producing, aerodynamically-shaped nosetip 12 at its forward extremity, forward of the payload, which for present discussion purposes may be an explosive warhead 14. A propulsion unit 16 extends aft of the payload, and a stabilizer 18 is attached to the aft extremity of the propulsion unit. In flight, the projectile is oriented at an angle α relative to the direction of flight by the lift of the nosetip 12 such that the total lift on the projectile equals the projectile weight to neutralize the effect of gravity. This balance of forces permits the projectile 10 to fly a substantially flat trajectory, which, if utilized in a weapon system, effectively eliminates the requirement for the launch personnel to correct for vertical drop of the projectile, and thus substantially improves the accuracy of the projectile in lifting the target.

Figure 2:
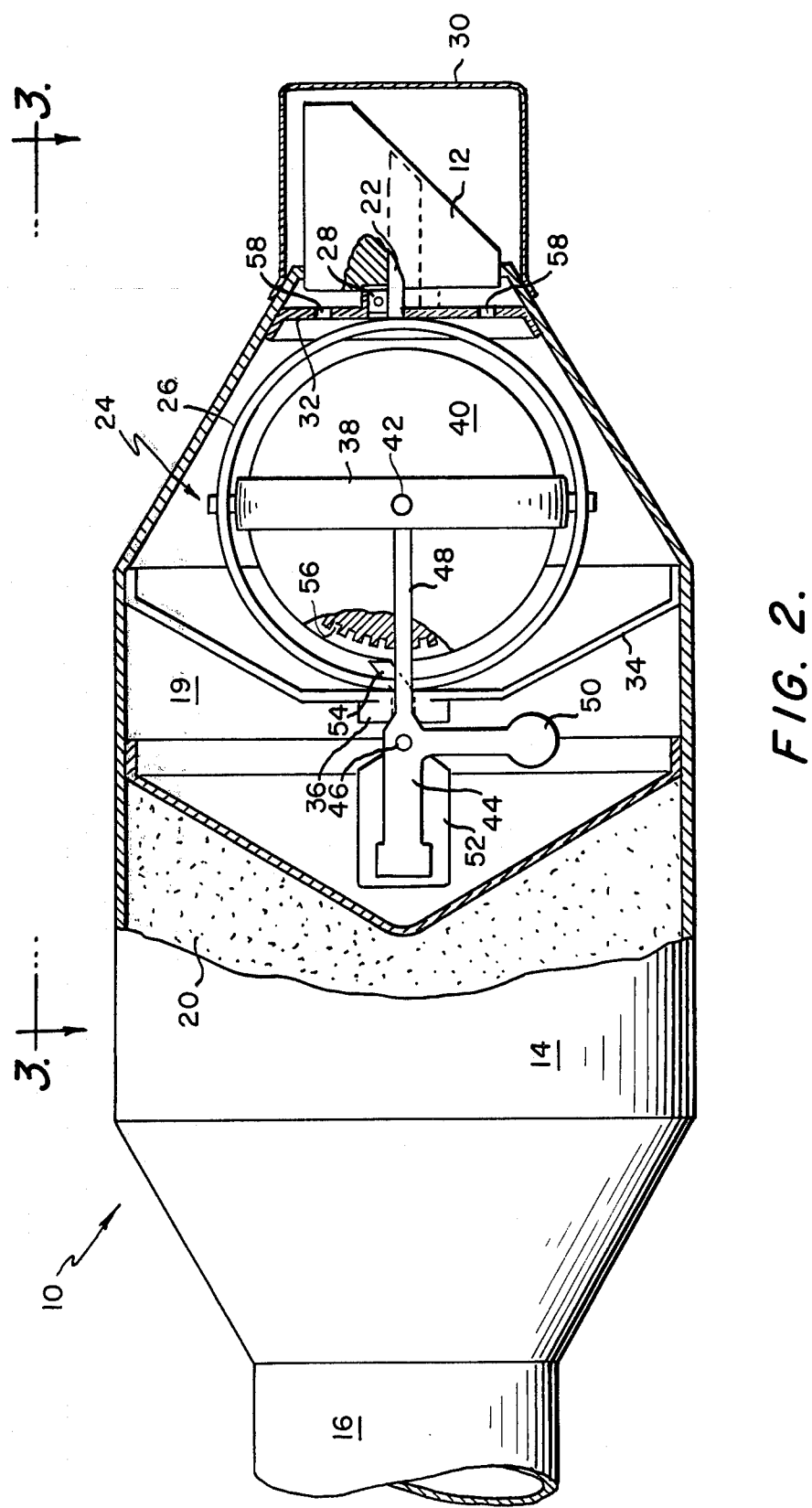
FIG. 2 is a partially-sectioned, elevation view of the projectile of FIG. 1, showing more fully the roll control system.

Shown in FIG. 2 is the roll control system for maintaining the nosetip lift vector vertical. The forward portion of the projectile 10 is sectioned to show the control system positioned within a cavity 19 forward of the explosive charge 20. By way of illustration only, the warhead 14 is a shaped-charge explosive, and the cavity 19 forms a part of the standoff distance associated with effective performance of the shaped charge. The lift-producing nosetip 12 is affixed to an axial shaft 22 and extends forwardly from the open, forwardmost extremity of the projectile 10, with the aft end of the shaft 22 being attached to a forward point on the outer gimbal 26 of a displacement-type gyroscope 24 and supported within a forward bearing 28 adjacent this point of attachment. This arrangement permits the nosetip and the outer gimbal to rotate as a unit. For simplicity of design and to reduce any possible problems associated with air flow through the cavity 19, the lifting nosetip 12 may be a solid body of revolution, with its leading edge cut at the proper angle for generation of the required lift. Alternatively, the nosetip may be a hollow, circular cylinder with the forward, slanted surface being a separate element suitably attached thereto. A protective cover 30 fits over the nosetip 12 and is releasably attached to the nose of the projectile 10.

Forward bearing 28 is supported within an aperture provided in a forward partition 32, the partition serving to close the cavity 19. A strut 34 extends diametrically across the cavity to support an aft bearing 36, which is axially aligned with the nosetip shaft 22 and the forward bearing 28, to provide the other rotatable support point for the outer gimbal 26. Inner gimbal 38 of the gyroscope 24 is pivotally supported on the outer gimbal 26, the rotational axis of the inner gimbal 38 being orthogonal to that of the outer gimbal 26, as is known in the art. The gyroscope rotor 40, in turn, is rotationally supported by a shaft 42 pinned to the inner gimbal 38.

During storage and prior to launch of the projectile 10, the inner gimbal 38 is maintained at an angle of 90 degrees to the outer gimbal 26 by a pair of caging fingers 44 (FIGS. 2–4), which are T-shaped members pivotally supported about a pin 46 attached to the support strut 34 and extending orthogonally to the axis of the nosetip shaft 22. The tips of the longer, slender arm 48 of the caging fingers are curved to abut the lower surface of the rotor shaft 42 to prevent rotation of the inner gimbal 38 and the outer gimbal 26 about their respective rotational axis. This immobilizing effect of the caging finger 44 can be seen more clearly in FIG. 4. The abutting engagement of the curved tip 49 with the rotor shaft 42 prevents up-and-down displacement (relative to FIG. 4) of the rotor shaft, thus preventing rotation of the outer gimbal 26 about its rotational axis colinear with the axis of the nosetip shaft 22, and back-and-forth movement (relative to FIG. 4) of the rotor shaft 42 is also prevented to preclude rotation of the inner gimbal 38 about its axis. Pendulum weights 50, depending downwardly from the arms 48 of the caging fingers 44, align the nosetip 12 in its correct vertical orientation. The acceleration force of launch rotates the pendulum weights about the rod 46, i.e., the pivotal axis of the caging fingers, to their neutral positions (FIG. 5) to free the inner and outer gimbals. To prevent inadvertent rotation of the caging fingers, such as may be experienced during rough handling of the projectile 10, a shear pin 47 is inserted into aligned holes (not shown) provided in the hub 51 of the caging fingers 44 and the rod 46 about which the fingers rotate (FIG. 4). The pins 47 are sheared by the acceleration force of launch to permit unhindered rotation of the caging fingers.

Figure 3:
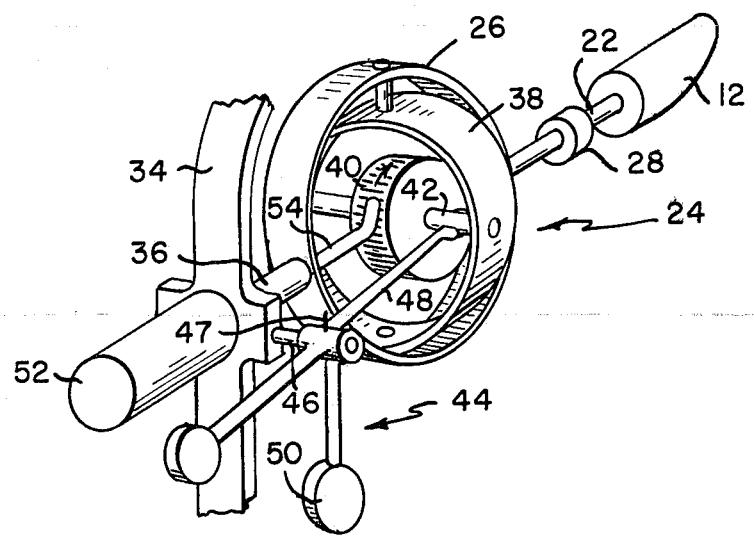
FIG. 3 is a partial, pictorial, perspective view of the roll control system, looking forward toward the projectile nose.
Figure 5:
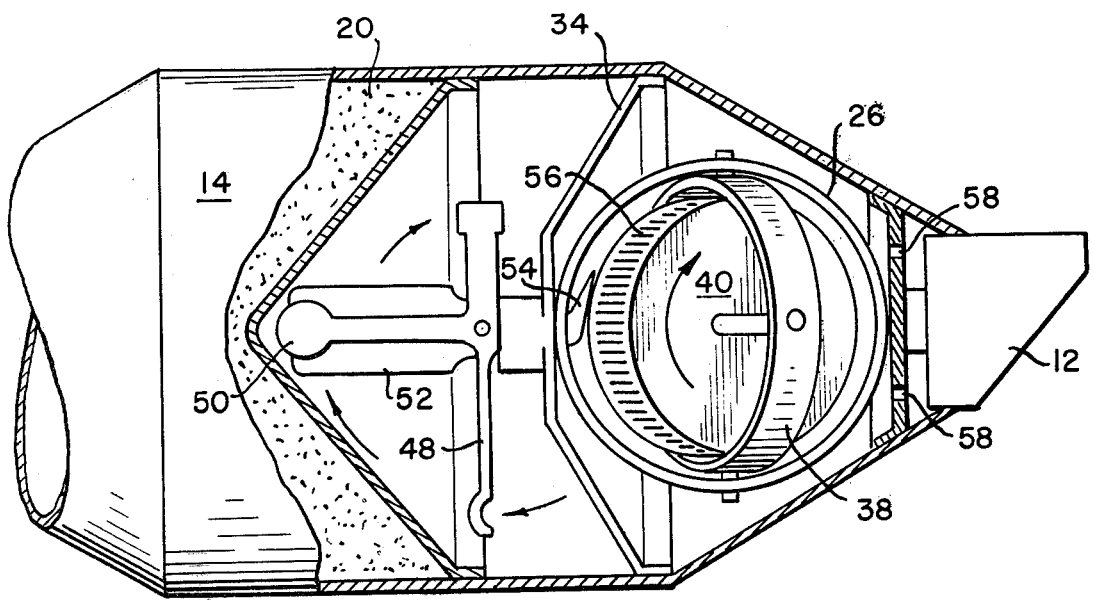
FIG. 5 is a view similar to FIG. 2, showing the roll control system after projectile launch.

Initial spinning of the gyroscope rotor 40 may be achieved by any suitable means, one of which is shown in FIGS. 2, 3 and 5. A gas generator 52, such as a pyrotechnic propellant cartridge appropriately initiated by a spark from a piezoelectric crystal, both items well known in the art, is suitably mounted upon the support strut 34 (FIG. 3) and is coupled to a canted nozzle 54 which directs the gas tangentially at the rotor 40. The nozzle 54 extends forwardly from the gas generator 52, longitudinally through the housing of the aft bearing 36 (note broken lines in FIG. 2), and through an aperture in the outer gimbal 26 located directly adjacent to and in line with the aft bearing, terminating at an angle adjacent to the gyroscope rotor 40. Since the pivotal axis of the outer gimbal coincides with the centerline of the nozzle, there is no interference with the free movement of the gyroscope 24.

A plurality of turbine-like blades 56 are provided along the periphery of the rotor 40 for coaction with the gas generator 52 and the nozzle 54, the blades being so designed such that the rotor is self-centering, i.e., the inner gimbal 38 continues to remain 90 degrees from the outer gimbal 26, as long as the gas generator operates. Rotor turbine-like blades 56 may be conveniently formed on the periphery by any suitable, known means. Gas from the generator 52 exhausts from the cavity 19 through vents 58 in the forward partition 32, blowing off the protective cover 30 in the process to expose the nosetip 12 to the air flow.

In operation, the projectile 10 and the roll control system are oriented as shown in FIGS. 2 and 3. The projectile is loaded into an appropriate launcher and aimed at the target, with the proper initial orientation of the nosetip achieved by any suitable method, such as a cooperating pin-and-slot arrangement on the projectile body and the launcher. The propulsion unit 16 is ignited by suitable means known in the art. At the instant of firing, the gas generator 52 is ignited to spin up the rotor, as described hereinabove. Simultaneously, the launching acceleration rotates the pendulum weights 50 to their neutral positions, causing the arms 48 of the caging fingers 44 to rotate away from and to free the inner gimbal 38 (FIG. 5). Since the rotor turbine blades are designed so that the rotor is self-centering, the inner gimbal continues to remain at 90 degrees to the outer gimbal as long as the gas generator operates. The gas from the generator 52 blows off the cover 30, and the resultant air flow pass the now-exposed nosetip 12 produces the necessary lift to position the projectile 10 at the proper angle of attack to generate the weight-neutralizing lift.

A particularly noteworthy feature of the present invention is that the body of projectile 10 is free to rotate with respect to the nosetip 12 and the gyroscope assembly 24 during flight. The gyroscope rotor 40 will maintain its initial roll orientation in space regardless of the projectiles movements in pitch, yaw or roll. Any torque applied to the nosetip 12 is resisted by the gyroscope which permits the inner gimbal 38 to precess (rotate) with respect to the outer gimbal 26. This resistance continues until the inner and outer gimbals are aligned.

In the foregoing embodiment, the lift produced by the nosetip 12 is sufficient to incline the projectile 10 at the proper angle of attack, with the major portion of the total required lift being produced by the air flow past the projectile. Another embodiment of the present unguided, flat-trajectory projectile employing a roll-stabilized, lift-producing device is shown in FIGS. 6–9, wherein the gyro-controlled lifting section is located aft of the warhead. This embodiment is particularly suitable if packaging volume in the nose of the projectile is limited, or if the positioning of additional structure forward of the warhead explosive charge is not possible or not desirable. Projectile 10' has the explosive charge 20 located in the forward portion of the warhead 14. A conical volume 62 is defined by the space situated aft of the warhead 14, behind a partition 64 which separates the explosive charge 20 from the volume 62, and within a conical fairing 63 interconnecting the warhead and the projectiles' propulsion unit 16.

A displacement-type gyroscope 24' is rigidly coupled to the conical fairing 63 by the secure attachment of the outer gimbal 26' to a support strut 90, the ends of the strut being securely attached to the inner surface of the conical fairing. By this arrangement, the control force of the gyroscope 24' is transmitted directly to the conical fairing 63, with the fairing and the outer gimbal free to rotate as a unit relative to the projectile body.

Extending axially through the volume 62 is a longitudinal, connecting shaft 66, which provides the structural link between the warhead 14 and the propulsion unit 16 of the projectile 10' and interconnects these elements. The forward end of the shaft 66 is afixed to the casing of a detonator 68, which in turn is supported by the partition 64, and the aft end of the shaft extends through a pair of closure partitions 72 and 73 located in the open, forward end of the propulsion unit housing. At both forward and aft juncture points of the shaft 66 with the outer gimbal 26', the shaft extends through forward bearing 28' and aft bearing 36', respectively, provided in apertures in the outer gimbal to permit free rotation of the gimbal about the shaft. A spring 70 encircles the forward portion of shaft 66 and is positioned between the bearing 28' and the detonator 68. Similarly, a second spring 74 encircles the aft portion of the shaft 66 and is biased between the aft bearing 36' and the closure partition 72.

Figure 7:
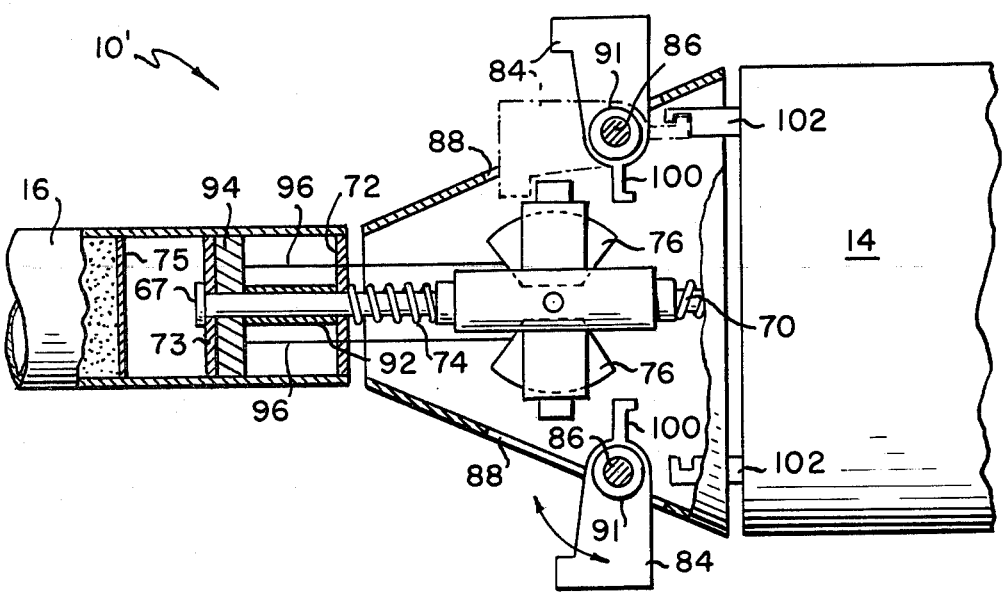
FIG. 7 is a view along line 7—7 of FIG. 6.

Springs 70 and 74 are compressed when the projectile 10' is in the pre-launch configuration of FIG. 6 to provide the force necessary to urge apart the warhead structure 14, the conical fairing 63 and the propulsion unit housing 74 subsequent to launch (FIG. 7), as will be considered more fully hereinbelow. To achieve the necessary spring compression, the aft end of the shaft 66 extends through a bushing 92 joining the partitions 72 and 73 and terminates in an enlarged head 67 which abuts against the wall 73 when the projectile 10' is in flight (FIG. 7). When the conical fairing 63 is brought into abutment with the warhead 14 and the propulsion unit 16 during the rotor wind-up process described below, the shaft 66 slides within the bushing 92 and the springs 70 and 74 are compressed (note FIGS. 6 and 7).

To permit the longitudinal shaft 66 to extend uninterruptedly through the volume 62, gyroscope 24' employs a dual, or split, conical-shaped rotors 76 (FIG. 8), rotationally mounted upon a transverse shaft 78 by means of bearings 80, the ends of the shaft 78 being fixed to the inner gimbal 38. Use of the split rotors 76, in addition to permiting passage of the support shaft 66, also allows the inner gimbal to precess 45°. The transverse shaft 78 intersects the support shaft 66 in a spherical bearing 82, which permits rotation and precession of the inner gimbal relative to the support shaft 66. The spherical bearing 82 is also free to slide along the shaft 66, thus allowing axial motion of the gyroscope 24'-conical fairing 63 assembly with respect to the warhead 14 and the propulsion unit 16.

The lift in projectile 10' is provided by a pair of L-shaped wings 84, which are rotatably supported on pivot pins 86 afixed to the conical fairing 63. Slots or openings 88 (FIG. 7) are provided in the fairing to permit unobstructed movement of the wings into and out from the volume 62. A torsion spring 90 biases each wing outwardly from the volume 62, from the folded position shown by the broken line into the flight position shown by the solid lines in FIG. 7. The L shape of the wings 84 permits the rear, L extension to engage the inner gimbal 38 and the end of the transverse shaft 78 when the wings are in the folded position, as shown by the broken line in the upper portion of FIG. 7, effectively cage the gyroscope 24' during projectile storage and loading. At the pivotal end of each wing is a hook or catch 100 which engages a notched retainer 102 attached to the warhead section 14 and extending into the fairing 63. With the wings 84 in the folded position, the hooks 100 engage the retainers to hold the fairing against the warhead 14 during projectile loading and launching. The wings may be maintained in their folded position by a disposable band (not shown), or what is more preferable, the entire projectile 10' can be packaged for transportation, storage and loading within a disposable launch tube (not shown). The disposable tube would restrain the wings in the folded position until projectile launch and provide proper orientation of the wings in anticipation of launch, in addition to offering protection to the projectile during handling and storage. Projectile launch would simply be a matter of coupling the lift-producing projectile 10'-and-launcher combination to a suitable firing device, and disposing of the launcher after projectile firing. Of course, the use of a disposable launch tube could be utilized with the embodiment of projectile 10 of FIGS. 1-5.

Figure 8:
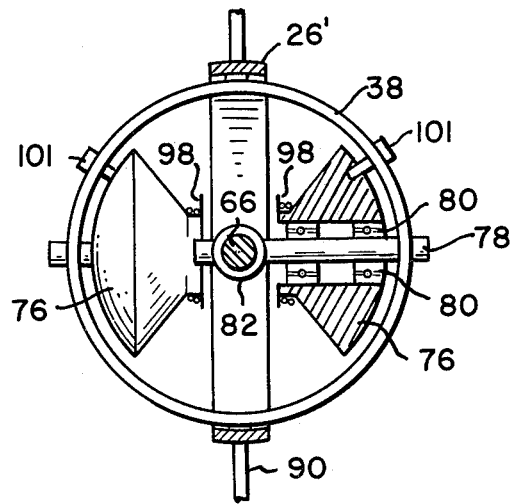
FIG. 8 is a view along line 8—8 of FIG. 6.

Initial spin is imparted to the rotors 76 by a unique inertial means shown in FIGS. 6-8. The forward portion of the propulsion unit housing is appropriately extended to provide a chamber 93 defined by the partitions 72 and 75, with the partition 73 intermediately located therebetween. A centrally-perforated, disk-shaped weight 94 is slidably positioned between the partitions 72 and 73, with its central perforation accommodating the bushing 92. A pair of flexible couplings, such as cords 96, are attached at one end to the weight 94 and at the other end to the rotors 76, adjacent to the longitudinal shaft 66. As can be seen in FIG. 8 each of the rotors 76 is provided with a circular flange 98 at the inner end of a constant-diameter, elongated segment about which is wound the free end of the cord 96.

In assembling the components of the projectile 10' the free ends of the cords 96 are wrapped around the rotors 76, and the rotors are then rotated to wind the cords thereupon. This winding of the cords draws the weight 94 forward against the partition wall 73; continued winding draws together into abutment the propulsion unit 16 and the conical fairing 63, compressing springs 70 and 74 in the process. Abutment of these components provides the necessary structural continuity to withstand the acceleration force. Shear elements 101 are inserted through holes in the inner gimbal 38 into properly located receiving recesses in the gyroscope rotors 76 (FIG. 8) to keep the cords 96 tightly wound and to prevent premature spinning of the rotors.

Upon launch of the projectile 10', the acceleration force displaces the weight 94 backwardly, drawing upon the cords 96 to sever the shear elements 101 to unwind the cords from the rotors 76, and causing the rotors to spin. After the projectile leaves the launch barrel, the lift-producing wings 84 are extended by the torsion springs 91, simultaneously causing the hooks 100 to rotate out of the retainers 102, thus freeing the warhead section 14 from the conical fairing 63. When the forces of the springs 70 and 74 exceed the acceleration force, these springs cause the fairing 63 and the propulsion unit 16 to separate to the limit established by the length of the longitudinal shaft 66, thus permitting the gyroscope 24' to control the conical fairing 63 and the lift-producing wings 84 to vertically orient the resultant lift while permitting the remainder of the projectile 10' to freely rotate relative to the fairing. In the flight condition, the longitudinal support shaft 66 provides interconnection between the warhead and the propulsion unit. The springs 70 and 73 tend to center the gyroscope 24'-conical fairing 63 assembly along the shaft 66. Since the wings 84 are located at or close to the center of gravity of the projectile 10', they produce the major portion of the necessary lift, with the remainder contributed by the rest of the projectile.

The projectile described herein achieves a flat trajectory in a relatively simple and inexpensive fashion, without the use of a highly complex guidance system or the use of high launch velocity. A weapon system employing such flat trajectory capability will exhibit increased first-round hit probability.

Obviously, numerous modifications and variations of the present invention are possible in the light of the above teachings. For example, the gyroscope can be used to stabilize other lift-generating devices, such as fins, other asymmetries and jets. The gyroscope can also be used to stabilize the entire projectile, i.e., the nosetip and the gyroscope could be directly connected to the body, such that the gyroscope prvents the entire projectile from rotating. The rotor can be spun up by means other than a gas generator or a wound cord. Thus, alternative means may encompass a spring, or a mechanical device which utilizes the motion of the projectile through the launcher to generate the roll acceleration of the gyroscope. It is therefore to be understood that within the scope of the appended claims the invention may be practiced otherwise than as specifically described herein.

What is claimed as new and desired to be secured by Letters Patent of the United States is:

1. A projectile capable of flat trajectory flight comprising:
   a payload section;
   a propulsion unit;
   a stabilized, aerodynamic lift-generating section rotatably mounted on the projectile to permit free, uncoupled rotation of the projectile relative to the lift-generating section, said stabilized lift generating section producing a resultant lift vertically oriented to counteract the projectile weight in order to obtain a substantially flat flight trajectory,
   said lift-generating section is gyroscopically stabilized in roll by a stabilizing gyroscope, having an inner and outer gimbal, to fixedly orient the resultant lift irrespestive of projectile rotation; and wherein said lift-generating section is fixedly attached to the outer gimbal of said stabilizing gyroscope.

2. The projectile of claim 1 wherein said lift-generating section is rotatably mounted forward of the payload section.

3. The projectile of claim 2 wherein said lift-generating section comprises an aerodynamically shaped lifting nosetip having a lift-producing, inclined forward surface.

4. The projectile of claim 3 further comprising:
a rotatably-supported shaft joining and lifting nosetip to the outer gimbal of the stabilizing gyroscope;
a gas generator for spinning the gyroscope rotor; and
caging means to maintain orthogonal orientation of the inner gimbal and the outer gimbal of said gyroscope prior to projectile launch and to provide initial orientation of said lifting nosetip immediately upon launch.

5. The projectile of claim 4 wherein said caging means are provided with means responsive to initial launch acceleration forces to displace said caging means into a neutral position to uncage the gimbals of said gyroscope.

6. The projectile of claim 5 further comprising a removable cover shrouding said lifting nosetip prior to projectile launch, said cover being removed by the exhaust of rotor-spinning gas from said gas generator.

7. The projectile of claim 1 wherein said lift-generating section is rotatably mounted aft of the payload section.

8. The projectile of claim 7 wherein said lift-generating section comprises:
a body section of the projectile fixedly attached to the outer gimbal of said stabilizing gyroscope, said body section freely rotatable relative to the remainder of the projectile during flight; and
retractable lifting surfaces pivotally attached to said body section.

9. The projectile of claim 8 further comprising:
openings in said body section to permit entry and egress of said lifting surfaces into and from within said body section; and
springs on said body section coacting with said lifting surfaces to bias said surfaces from the folded position interior of said body section to the extended position exterior of said body section.

10. The projectile of claim 9 further comprising:
longitudinal support means extending through said body section to interconnect said payload section and said propulsion unit; and
biasing springs on said support means urging apart said payload section and said propulsion unit from said lift-generating body section,
whereby said body section is spatially separated to permit free rotation of the projectile relative to said body section during projectile flight.

11. The projectile of claim 10 wherein said lifting surfaces, in the folded position, coact with said stabilizing gyroscope to cage the gyroscope.

12. The projectile of claim 9 further comprisings acceleration-responsive means to initiate rotor spin in said stabilizing gyroscope.

13. The projectile of claim 12 wherein said acceleration-responsive rotor-spinning means comprises:
a mass slidably disposed adjacent to said gyroscope; and
flexible connecting means joining said mass to the rotor of said gyroscope, said connecting means being wrappingly wound upon the rotor,
whereby said mass is displaced by acceleration during projectile launch, drawing upon said connecting means to unwind the connecting means from the rotor to initiate spinning of the rotor.

14. A flight control mechanism for a self-propelled, unguided projectile comprising:
an aerodynamic lift-producing device rotatably coupled to the projectile to permit free rotation relative to the projectile,
a gyroscope stabilizing means, having an inner and outer gimbal, fixedly attached to said lift producing device to roll stabilize said device,
said lift-producing device being fixedly attached to the outer gimbal of said gyroscopic stabilizing means; and
whereby the aerodynamic lift produced by said device counteracts the projectile weight in order to obtain a substantially flat flight trajectory.

15. The control mechanism of claim 14 wherein said lift-producing device comprises an aerodynamically-shaped lifting nosetip rotatably supported adjacent the nose portion of the projectile.

16. The control mechanism of claim 15 further comprising:
a rotatably-supported shaft fixedly joining said lifting nosetip to the outer gimbal of said gyroscopic stabilizing means;
caging means to maintain orthogonal orientation of the inner gimbal and the outer gimbal of said gyroscopic stabilizing means prior to launch and to provide initial orientation of said lifting nosetip immediately upon launch; and
a gas generator to initiate operation of said gyroscopic stabilizing means.

17. The control mechanism of claim 16 wherein said caging means includes means responsive to initial launch acceleration forces to uncage the gimbals of said gyroscopic stabilizing means.

18. The control mechanism of claim 17 further comprising a removable cover shrouding said lifting nosetip.

19. The control mechanism of claim 18 wherein said cover is forcibly ejected by gas pressure produced by said gas generator.

20. The control mechanism of claim 14 wherein said lift-producing device comprises:
an intermediate body section of the projectile fixedly attached to the outer gimbal of said gyroscopic stabilizing means, said body section freely rotatable relative to the remainder of the projectile during flight; and
retractable lifting surfaces pivotally supported by said body section.

21. The control mechanism of claim 20 further comprising:
openings in said body section to receive said lifting surfaces within said section; and
springs coacting with said lifting surfaces to bias said surfaces into the extended position exterior of said body section.

22. The control mechanism of claim 21 further comprising:
longitudinal support means extending through said body section to rotatably support the flight control mechanism on the projectile; and springs on said support means urging said body section apart from the remainder of the projectile to provide spatial separation between said body section and the remainder of the projectile.

23. The control mechanism of claim 22 further comprising caging means on said lifting surfaces coacting with said gyroscopic stabilizing means to cage said stabilizing means when the surfaces are folded within said body section.

24. The control mechanism of claim 23 further comprising acceleration-responsive means to initiate operation of said gyroscopic stabilizing means.

25. The control mechanism of claim 24 wherein said acceleration-responsive means comprise:
   a mass slidably positioned adjacent to said gyroscopic stabilizing means; and
   flexible couplings joining said mass to said stabilizing means,
   whereby acceleration forces displace said mass to exert a pull on said couplings to initiate spin acceleration within said stabilizing means.

* * * * *